US010099228B2

(12) United States Patent
Fitzpatrick et al.

(10) Patent No.: US 10,099,228 B2
(45) Date of Patent: Oct. 16, 2018

(54) APPARATUS FOR PERFORMING COUNTER FLOW CENTRIFUGATION AND METHOD OF USING SAME

(71) Applicant: Invetech, Inc., San Diego, CA (US)

(72) Inventors: Ian Fitzpatrick, Melbourne (AU); Mark Rob, Melbourne (AU); Adam Cusick, Melbourne (AU); Tim Craig, Melbourne (AU)

(73) Assignee: INVETECH, INC., San Diego, CA (US)

( * ) Notice: Subject to any disclaimer, the term of this patent is extended or adjusted under 35 U.S.C. 154(b) by 398 days.

(21) Appl. No.: 14/879,163

(22) Filed: Oct. 9, 2015

(65) Prior Publication Data

US 2017/0100725 A1    Apr. 13, 2017

(51) Int. Cl.
*B04B 5/04* (2006.01)
*B04B 9/08* (2006.01)
*B01D 21/26* (2006.01)
*B01L 3/00* (2006.01)

(52) U.S. Cl.
CPC .............. *B04B 9/08* (2013.01); *B01D 21/262* (2013.01); *B01L 3/5021* (2013.01); *B04B 5/0442* (2013.01); *B04B 2005/0471* (2013.01); *B04B 2005/0492* (2013.01)

(58) Field of Classification Search
CPC . B04B 9/08; B04B 5/0442; B04B 2005/0492; B04B 2005/0471; B01D 21/262; B01L 3/5021
USPC ..................................................... 494/18, 84
See application file for complete search history.

(56) References Cited

U.S. PATENT DOCUMENTS

| 3,286,305 | A |   | 11/1966 | Seckel |
|-----------|---|---|---------|--------|
| 3,987,961 | A |   | 10/1976 | Sinn et al. |
| 4,056,224 | A |   | 11/1977 | Lolachi |
| 4,146,172 | A |   | 3/1979  | Cullis et al. |
| 4,296,882 | A | * | 10/1981 | Kobayashi ............ B04B 5/0442 366/219 |
| 5,350,514 | A | * | 9/1994  | Witthaus ............... B04B 5/0442 210/360.1 |
| 5,360,542 | A |   | 11/1994 | Williamson et al. |

(Continued)

FOREIGN PATENT DOCUMENTS

JP      57151853 A  *  9/1982

OTHER PUBLICATIONS

International Search Report and Written Opinion corresponding International Application No. PCT/US16/52853 dated Dec. 9, 2016.

*Primary Examiner* — Charles Cooley
(74) *Attorney, Agent, or Firm* — Cheryl L. Gastineau; Reed Smith LLP

(57) ABSTRACT

An apparatus and method for performing counter flow centrifugation. The apparatus includes at least one vessel, a gear fixedly attached to at least a portion of the vessel such that rotation of the gear rotates the vessel, a handle assembly and a plurality of tubes extending through the handle assembly and to the vessel. The gear is configured to be rotated by a drive system. The handle assembly is rotatably attached to the gear and includes an opening therein. At least a portion of the gear engages at least a portion of the drive system through the opening. The handle assembly is configured to be rotated by the drive system. The vessel can be rotated at twice a speed of the handle assembly when the apparatus is inserted into a bowl of the counter flow centrifuge.

20 Claims, 8 Drawing Sheets

(56) References Cited

U.S. PATENT DOCUMENTS

| | | | |
|---|---|---|---|
| 6,589,153 B2 | 7/2003 | Dolecek et al. | |
| 8,496,609 B2 | 7/2013 | Childers et al. | |
| 9,839,920 B2* | 12/2017 | Mehta | B04B 5/0442 |
| 2006/0111229 A1* | 5/2006 | Aitkenhead | B04B 5/0442 494/83 |
| 2007/0102374 A1 | 5/2007 | Kolenbrander | |
| 2012/0270717 A1* | 10/2012 | Mehta | B04B 5/0442 494/10 |
| 2017/0100725 A1* | 4/2017 | Fitzpatrick | B01D 21/262 |

* cited by examiner

APPARATUS FOR PERFORMING COUNTER FLOW CENTRIFUGATION AND METHOD OF USING SAME

SUMMARY

The present disclosure, in one embodiment, is directed generally to a centrifuge, in which an apparatus is insertable into and removable from a bowl, and a method of installing or using same.

The ability to process animal and human cells is a primary requirement for laboratory research, cell expansion and the cell therapeutics market. There is an increasing use of live, animal and human-derived, cells for therapeutic use. Such use is creating demand for technologies that are uniquely aligned for dealing with live cells as the final product. Examples of known biopharmaceutical manufacture methods are disclosed in U.S. Pat. No. 7,588,692 and U.S. Patent Application Publication No. 2011/0207225, which are each herein incorporated by reference in their entirety.

Counter flow centrifugation is a technique that creates an environment where material, such as particles (e.g., live cells), is suspended between a centrifugal force and an inward-flowing suspension fluid as a fluidized bed. The fluidized bed can be used to capture the cells and allow exchange of the media they are supported in. Changes to the working or operating conditions of the centrifuge can be used to selectively drive cell populations from the fluidized bed, elutriate, and/or retain cells in the bed. Counter flow centrifugation enables removal of particulate contamination from a cell suspension, and enables increased viability of the retained cell population through cell viability through selective removal of dead cells. It is important for live cell processing that the system be sterile.

To achieve a robust, closed and/or aseptic fluidic system, one skilled in the art may know to use a "skip rope" plumbing design in a counter flow centrifugation system (see, e.g., U.S. Publication No. 2010/0261596 by Schimmelpfennig, et al.). Such a design eliminates the need for sliding seals between the stationary and rotating elements. Currently available systems require a complicated, time-consuming and error-prone process to install the "skip rope," and are limited to a single vessel size, which restricts functionality.

The present invention overcomes the above-identified disadvantages of currently-available technology, and accomplishes the above and other objectives. For example, in one embodiment, the present application is directed to a counter flow centrifuge system that enables a complete aseptic disposable set incorporating counter flow centrifugation to be supplied without the need for additional sterile connections, and the installation of the rotating counter flow centrifuge elements can be achieved as a single, greatly simplified step. Such a design facilitates adoption of the technology by users and integration of the technology as part of larger processing system without complex installation procedures or the need for sterile connections.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings.

DETAILED DESCRIPTION OF THE INVENTION

Figure 1:
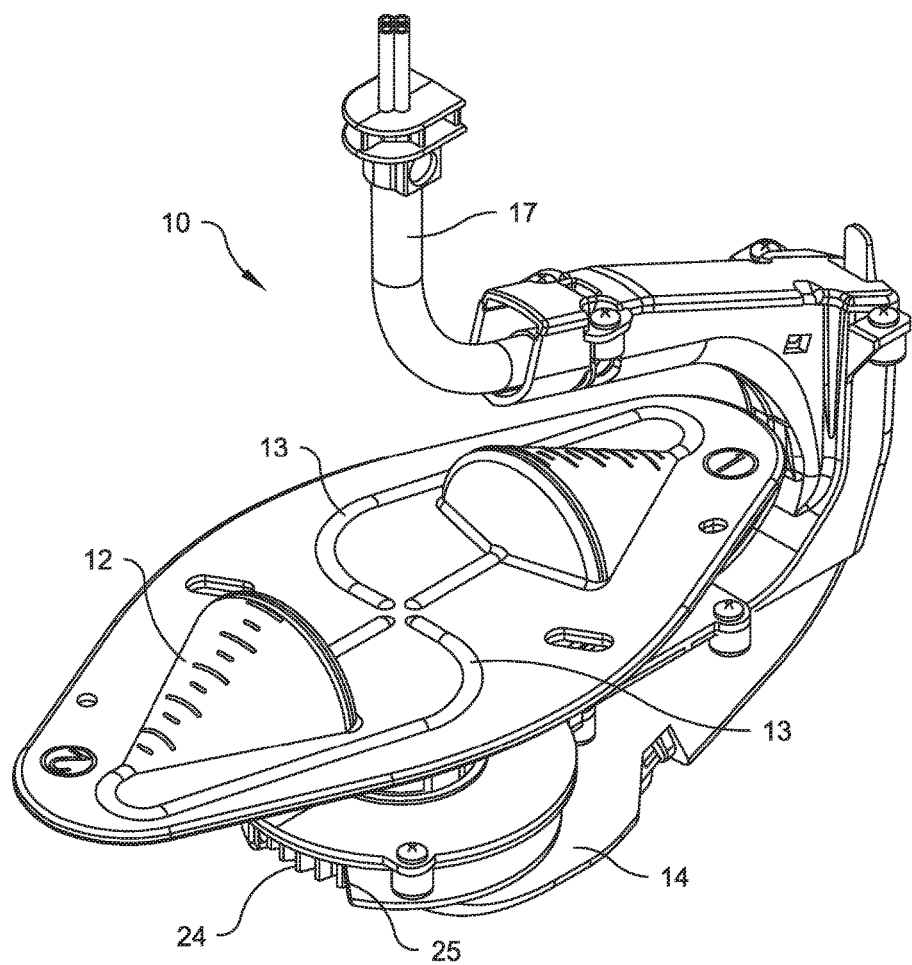
FIG. 1 is a top perspective view of an apparatus according to an embodiment of the present disclosure.
Figure 2:
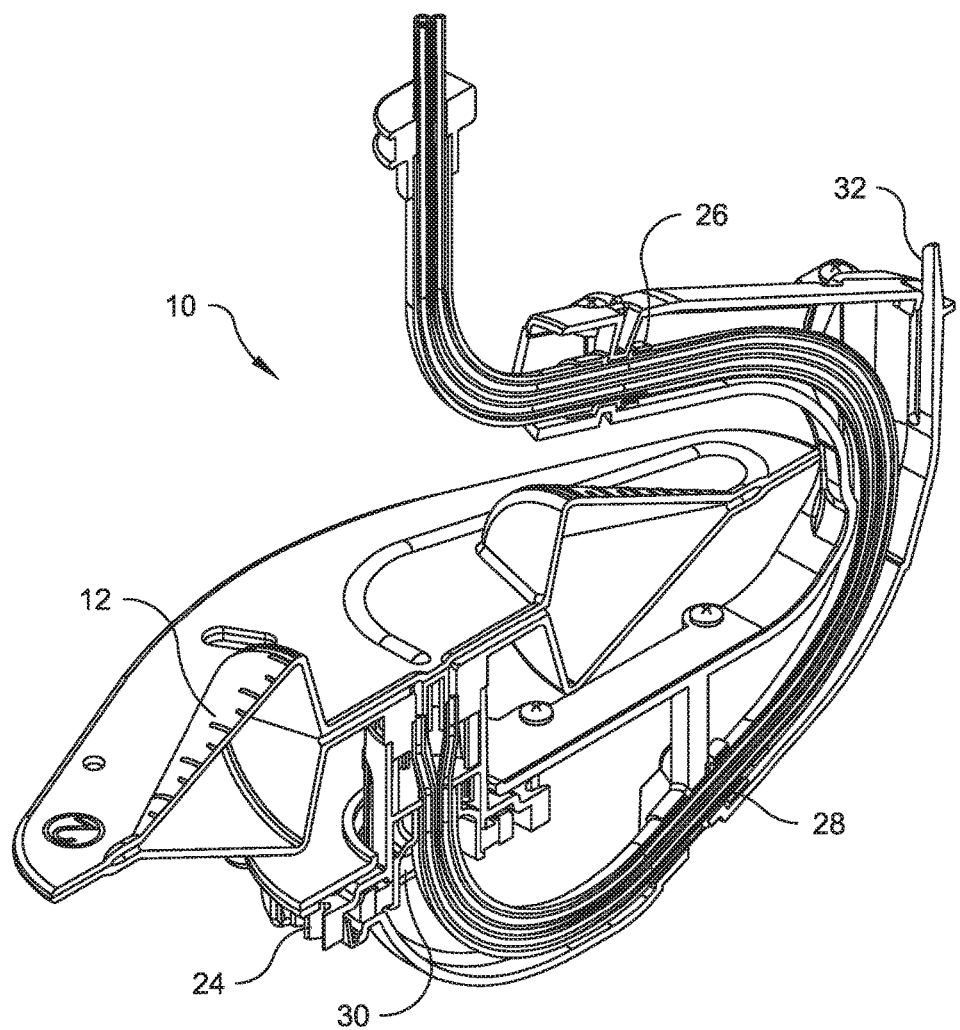
FIG. 2 is a cross-sectional view of the apparatus of FIG. 1.

Certain terminology is used in the following description for convenience only and is not limiting. The words "lower" and "upper" designate directions in the drawings to which reference is made. Unless specifically set forth herein, the terms "a," "an" and "the" are not limited to one element but instead should be read as meaning "at least one." The terminology includes the words noted above, derivatives thereof and words of similar import.

In one embodiment, the present invention includes a combination of a disposable or removable housing or apparatus configured to be used with a bowl of a centrifuge. The apparatus can include one, two opposing, or more vessels forming part of a single plastic rotor attached to a handle assembly. The rotor can be aseptically connected to two, four or more fixed tubes via the handle assembly. The tubes can provide fluid inlet and outlet to the vessels. The rotor can be mounted to and driven by a gear at twice the rotational speed of the handle assembly. The handle assembly can contain a bearing for the gear and, therefore, rotor to pivot on. The handle assembly may be primarily responsible for retaining the tube(s) rotational mountings during rotation, and preventing the tubing from undesirably twisting.

The rotor bearing and "skip-rope" tubes contained in the disposable housing facilitate quick and easy loading of the disposable into an accompanying centrifuge bowl assembly using a single lock-in action. The apparatus allows for various processing volumes dependent on the chosen disposable size variant. In one embodiment, the apparatus also allows for two simultaneous processes by providing two separate vessels on separate fluid circuits.

More particularly, in one embodiment, the apparatus can be a rigid, plastic molded rotor containing two opposing vessels. The size of the vessels can be modified depending upon user's process requirements. Four polymeric tubes can be aseptically connected to the inlets of the molded rotor. The tubes can be configured to carry process fluids to and from each of the vessels. The tubes can run the full length of the apparatus in a "skip rope" fashion, and can pass through all of the components of the apparatus, most particularly the main rotor bearing. The main rotor bearing can attach to the polymer drive gear for an assembly connecting to the lower half of the molded rotor. The gear can interface or engage with another gear in the accompanying centrifuge bowl assembly.

A handle assembly can contain or support a lower half of the gear. The handle assembly can be fastened to the bearing assembly. The handle assembly can support and protect the tubes and any sheathing surrounding the tubes. The handle assembly can include locating and locking features that interact with the accompanying centrifuge bowl to position and secure the apparatus. The sheathing can be formed of various polymer components, and can connect to an underside of the gear assembly. The tubes may run through a passageway in the sheath. The sheath can incorporate bearings, which interface with features in the handle assembly. The sheath can terminate at an anchor feature, which fixes the tubes and the sheath in a stationary position on the accompanying centrifuge bowl assembly.

In operation, the apparatus can be loaded into a centrifuge bowl assembly. The apparatus can then be locked into position in the centrifuge bowl, such as by one or more features on the handle assembly and/or by securing the anchor component. The tubes can be pre-connected to a tube set on the centrifuge device. The tube set can control flow rates, connects various fluids, and/or controls one or more fluid paths to/from the vessel(s). The centrifuge bowl and the handle assembly can rotate together at a set rotational speed. The gearing in the centrifuge bowl can interface with at least a portion of the apparatus, thereby causing at least the rotor and vessels to rotate at twice the rate of the handle assembly. With the "skip rope" configuration of the tubes, this speed differential allows the anchor end (e.g., upper end) of the tubes to remain stationary, while the molded rotor rotates at twice the speed of the centrifuge bowl (and the handle assembly) without twisting. By varying the rotational speed and fluid flow rate, various cell processing procedures can be carried out.

The apparatus of the present disclosure is an improvement over existing technology, at least because the housing assembly facilitates quick and easy loading of the apparatus into the accompanying centrifuge bowl assembly. In addition, the molded rotor allows for various processing conditions dependent upon the chosen vessel size and/or shape. Furthermore, the molded rotor with the two separate vessels allows two processes to run simultaneously in the single apparatus on separate vessel circuits. Thus, the apparatus allows for quicker and easier use, as well as greater functionality and flexibility as compared to the prior art. The apparatus can be used to carry out a variety of cell processing procedures, such as cell/particle washing or media exchange, cell/particle volume reduction, cell/particle separation (elutriation), cell/particle removal (e.g., Red Blood Cell (RBC) debulking), and/or recirculation of cell/particle suspension through a Counter-Flow Centrifuge (CFC) chamber.

In other embodiments, the handle assembly described above can be replaced with a fully enclosed cylindrical or other shaped housing. Alternatively, the handle assembly could be reduced to simply enclose or support the gear and lower sheath bearing. The accompanying centrifuge device could enclose or support any remaining components. The handle assembly can also include alternative bearing retaining features, such as one or more clips, press fits, etc.

In one embodiment, a combination can include a counter flow centrifuge having a bowl and a drive system. An apparatus is configured for use in the counter flow centrifuge. The apparatus can include at least two vessels. Each vessel can include an inlet and an outlet. A gear can be fixedly attached to at least a portion of each vessel such that rotation of the gear rotates the vessels. The gear can be configured to be rotated by the drive system of the counter flow centrifuge. A handle assembly can be rotatably attached to the gear. The handle assembly can be configured to be rotated by the drive system of the counter flow centrifuge. A plurality of tubes can extend through the handle assembly and to the vessels. One of the plurality of tubes can be connected to the inlet of each vessel and one of the plurality of tubes can be connected to the outlet of each vessel. In one embodiment, the gear can be rotated at twice a speed of the handle assembly when the apparatus is inserted into the bowl of the counter flow centrifuge to suspend material in the at least one vessel when fluid containing the material flows from a reservoir, through the tubes and into the vessels.

In one embodiment, each vessel has a first end and an opposing second end. The first end of each vessel can be the inlet. The second end of each vessel can be the outlet. A diameter of the first end can be smaller than a diameter of the second end to form a generally conical shape. The first end can be positioned proximate an outer periphery of the plates. A first one of the plurality tubes can be connected to the first end of the first vessel. A second one of the tubes can be connected to the first end of the second vessel. A third one of the tubes can be connected to the second end of the first vessel. A fourth one of the tubes can be connected to the second end of the second vessel.

FIGS. 1-8 illustrate a disposable apparatus, generally designated 10, according to one embodiment of the present disclosure. The apparatus 10 can be configured for use in a counter flow centrifuge 20, and can be made using any of a variety of manufacturing techniques, such as injection-molding, blow-molding, machining, 3D printing, etc. The apparatus 10 can include one, two opposing, three or four vessels 12. In one embodiment, the vessels 12 are formed by two opposing plates 12a, 12b. The plates 12a, 12b can be fixedly attached. When combined or attached, the plates 12a, 12b can form channels or passageways 13, which permit fluid to flow therethrough In one embodiment, each vessel 12 can have a conical shape, wherein a tip or small end of the cone is positioned outwardly from the geometric center of each plate 12a, 12b, and the wider end of each cone is positioned proximate to the geometric center of each plate 12a, 12b. In one embodiment or configuration, fluid is designed to flow into each cone at the tip thereof, and out of each cone at an opening at the wider end of each cone. In another embodiment or configuration, the flow can be reversed (i.e., into the wider end and out of the tip), for example to capture cell population in a small fluid slug. The vessels 12 are not limited to the size, shape and/or configuration shown and described herein, but can include any of a variety of sizes, shapes and/or configures. In addition, each vessel 12 can have one, two or more inlets and/or outlets.

The apparatus 10 can include a handle assembly 14. The handle assembly 14 can be designed to be grasped by a user when inserting the apparatus 10 into the counter flow centrifuge 20 and removing the apparatus 10 from the counter flow centrifuge 20. A projection or clip 32 can be positioned on the handle assembly 14 to facilitate engagement with at least the bowl 18 of the counter flow centrifuge 20 and removal of the handle assembly 14 from the counter flow centrifuge 20. The clip 32 can at least temporarily engage a ledge (not shown) for example, within the counter flow centrifuge 20. The clip 32 can be spring-biased. The handle assembly 14 can be a bearing support mechanism, as described below.

A plurality of tubes 16 (e.g., four) can extend through the handle assembly 14. More particularly, each tube 16 can extend from a tube set (not shown), through the handle assembly 14, and to at least one of the vessels 12. The tube set may include or be operated by a controller to dictate flow rates, flow paths, and/or the type of fluid supplied. Each tube 16 can be configured to allow fluid to flow between the tube set and/or one or more reservoirs 50 (shown schematically in FIG. 8 and understood by those skilled in the art) and at least one of the vessels 12. In one embodiment, the reservoir (s) 50 can contain(s) fluid, including live cells or other material. The fluid can be pumped or otherwise caused to flow into at least one of the tubes 16. In an embodiment including four tubes 16 and two vessels 12, the fluid can be pumped into two of the tubes 16. Each tube 16 can correspond to or be connected to one of the channels 13, and each tube 16 can be formed of a flexible material. The tubes 16 may be positioned in a sheath 17 to protect the tubes 16.

In one of the embodiments, a first tube 16 is connected to the tip of the cone of a first one of the vessels 12, and a second tube 16 is connected to the tip of the cone of the second one of the vessels 12. In addition, a third tube 16 is connected to the opening at the wider end of the cone of the first one of the vessels 12, and a fourth tube 16 is connected to the opening at the wider end of the second one of the vessels 12. Thus, fluid flows into the vessels 12 via the first and second tubes 16, and fluid exits the vessels 12 via the third and fourth tubes 16.

A first bearing 26 can be located within an upper portion of the handle assembly 14, a second bearing 28 can be located within a lower portion of the handle assembly 14, and a third bearing 30 can be located proximate to and/or within a gear 24 (described in detail below). Each tube 16 can extend through each of the first, second and third bearings 26, 28.

Figure 3:
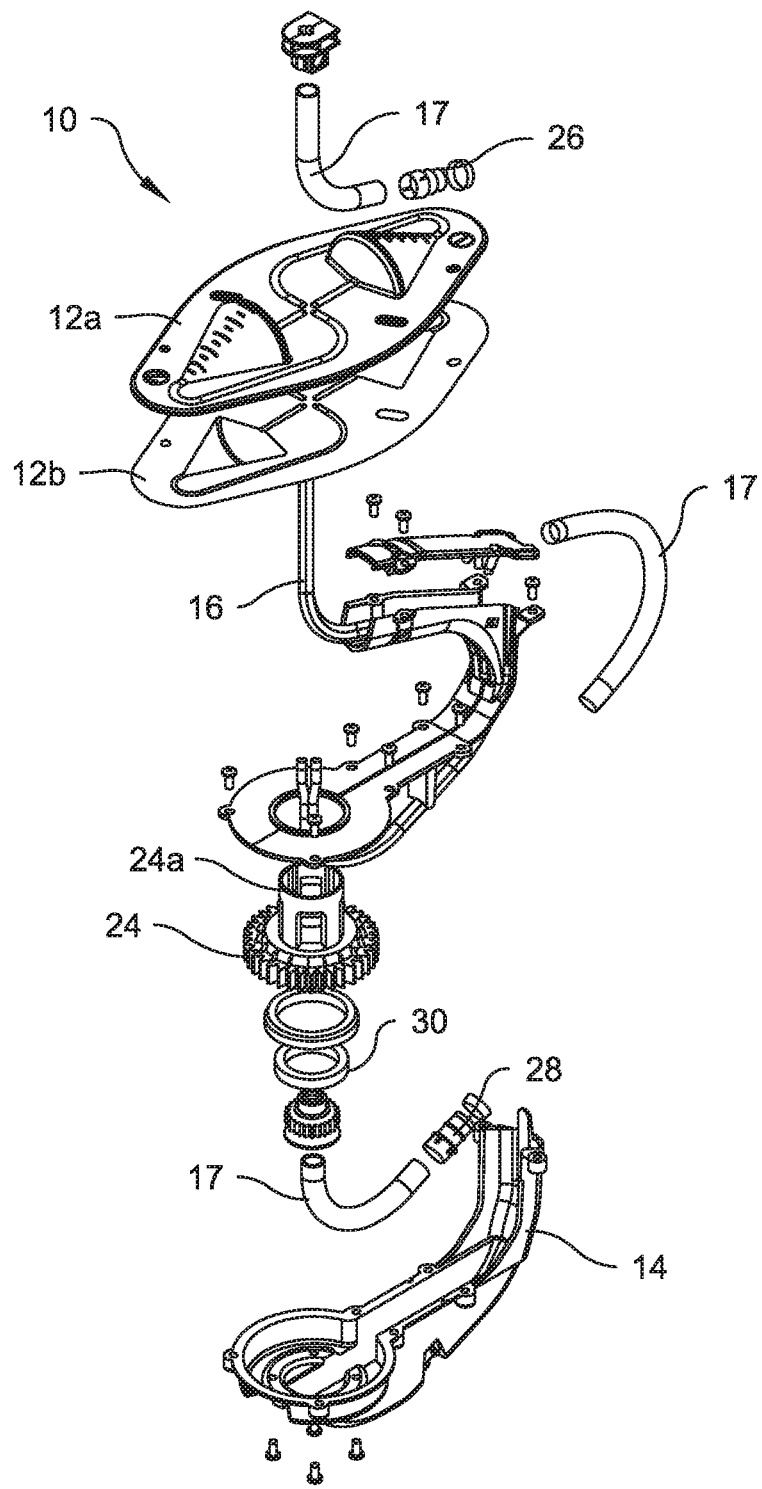
FIG. 3 is a partially exploded view of the apparatus of FIG. 1.
Figure 4:
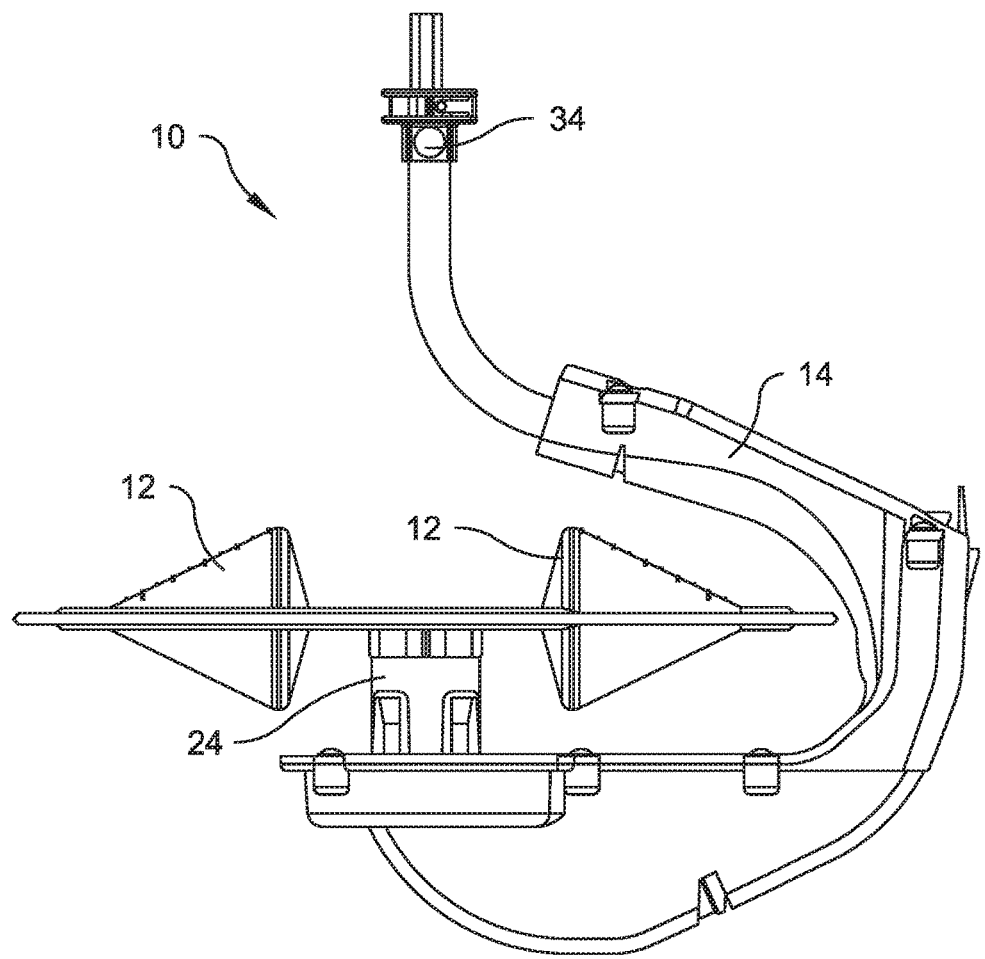
FIG. 4 is a side elevation view of the apparatus of FIG. 1.
Figure 5:
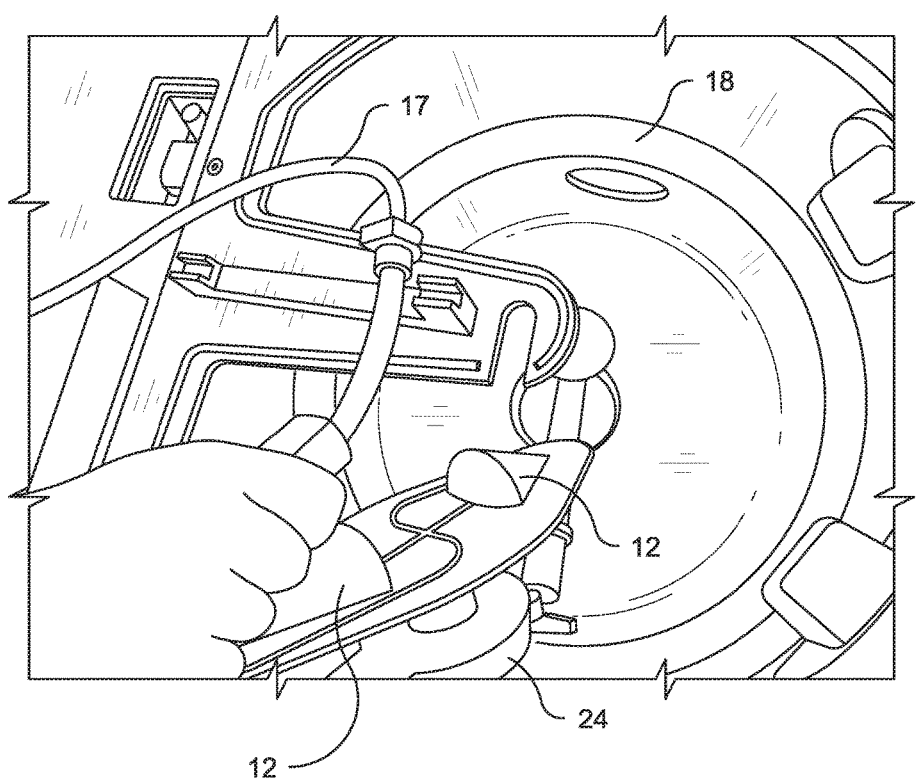
FIG. 5 is top perspective view of the apparatus being at least partially inserted into a bowl.
Figure 6:
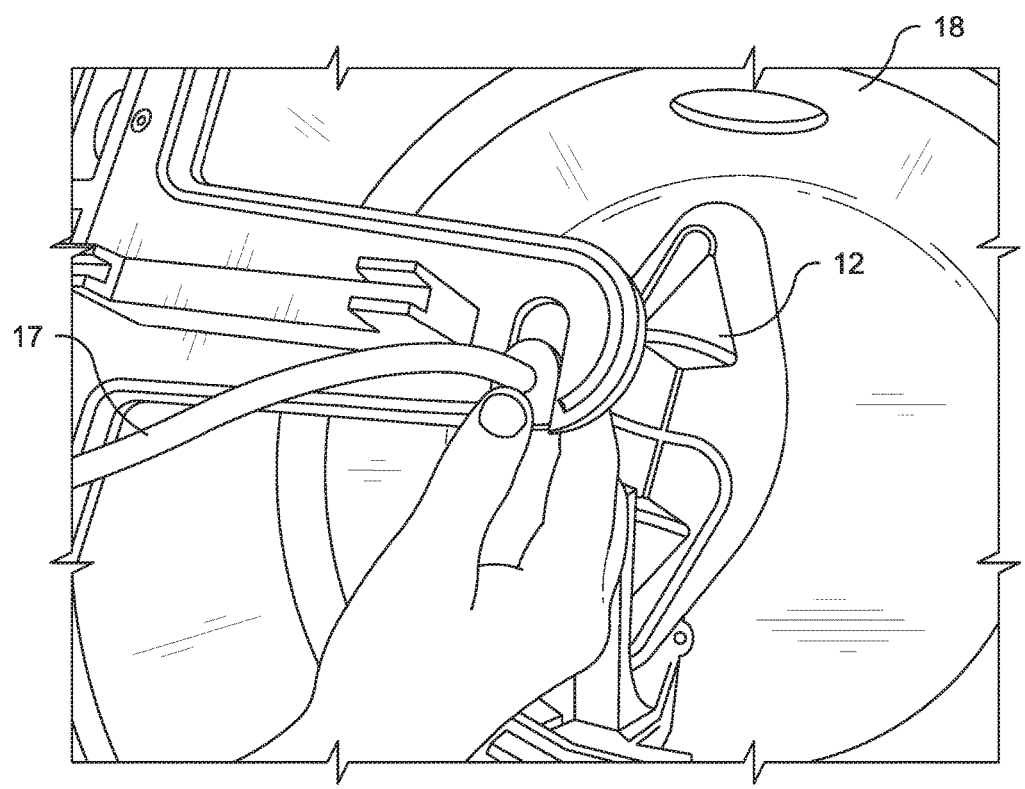
FIG. 6 is another top perspective view of the apparatus positioned at least partially within the bowl, wherein a cover of the centrifuge is shown in an open position.
Figure 7:
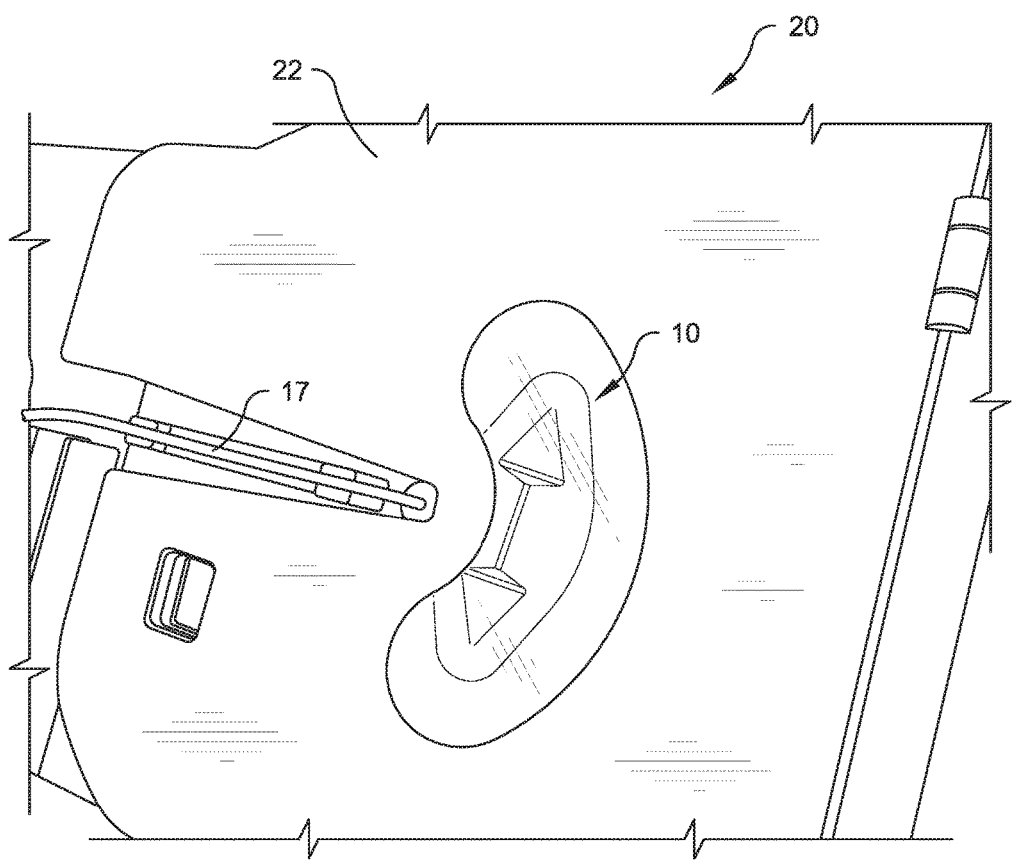
FIG. 7 is another top perspective view of the apparatus positioned within the bowl, wherein the cover of the centrifuge is shown in a closed position.
Figure 8:
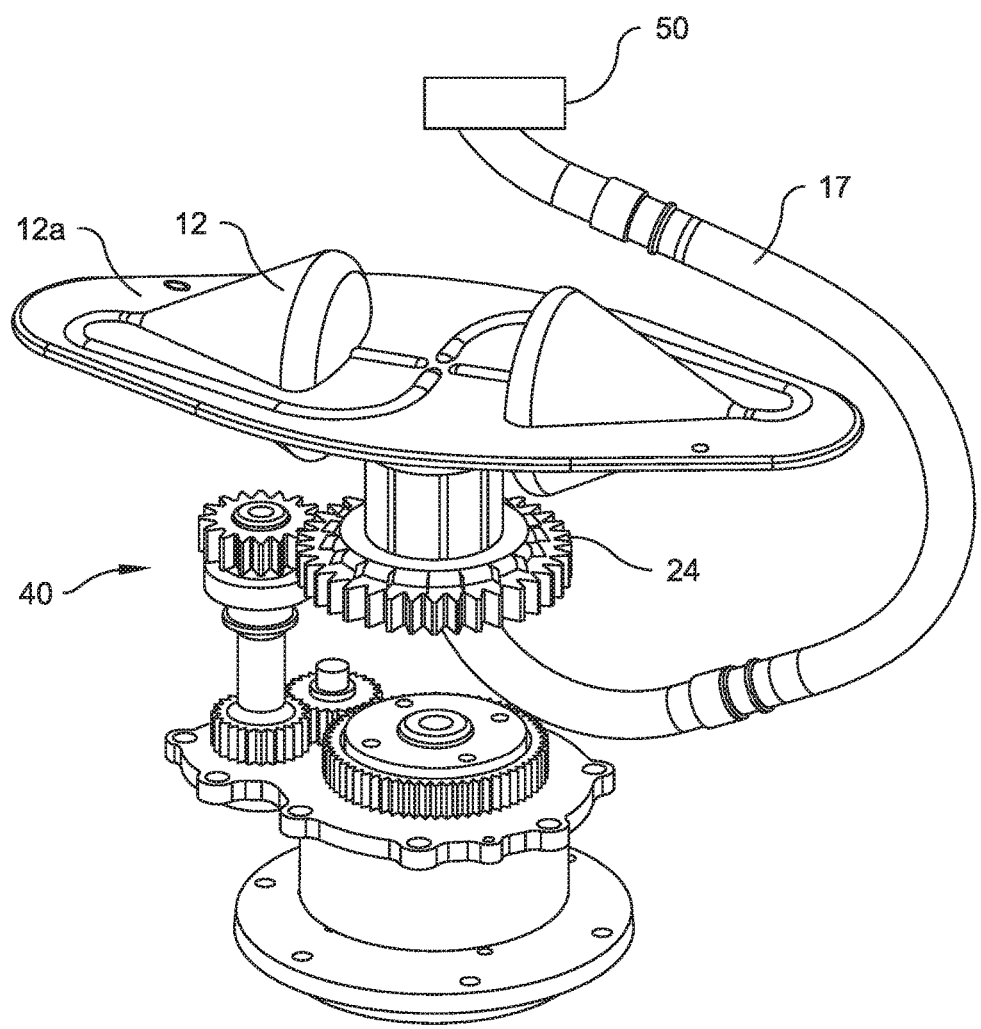
FIG. 8 is another perspective view of at least portions of a drive system of the apparatus.

As shown in FIGS. 3 and 8, the gear 24 can be attached to each vessel 12, such that rotation of the gear 24 rotates the vessels 12. More particularly, the gear 24 can be positioned within a portion of the handle assembly 14 and an extension or pinion 24a of the gear 24 may extend upwardly through an opening of the handle assembly 14 and engage a bottom portion of the bottom plate 12b. At least a portion of the gear 24 may be exposed by another opening (e.g., a window 25) of the handle assembly 14. As a result, the gear 24 can matingly engage and/or be driven by a rotor and/or a drive system, generally designated 40, (see FIG. 8) of or within the counter flow centrifuge 20. The handle assembly 14 can be driven by another portion of the counter flow centrifuge 20, such as a different portion of the drive system within the counter flow centrifuge 20. The gear ratios of the drive system can determine the 2:1 speed ratio, such that step-down gearing precisely maintains the 2:1 ratio. In one embodiment, the drive system can include a first drive system and a second drive system, such that both drive systems are separate and independent.

An identification device 34, such as a radio-frequency identification (RFID) chip, can be located in a portion of the apparatus to contain and record certain information (such as the serial number, number of hours of use, and/or the number of rotations of the apparatus 10 within the counter flow centrifuge 20). The identification device 34 can have read/write capability.

In operation, the apparatus 10 is configured to be inserted into and removed from a bowl 18 of the counter flow centrifuge 20. When the apparatus 10 is inserted into the bowl 18 of the counter flow centrifuge 20, the gear 24 and each vessel 12 can be rotated by the drive system at twice a speed of the handle assembly 14, which is rotated by a separate portion (e.g., gear) of the drive system. Fluid can be supplied to or injected into the vessels 12 in a direction opposite to the centrifugal force applied to the vessels 12 (inward toward the geometric center vs. outward away from the geometric center). Fluid flow can be increased until equilibrium is established between the force of the fluid flow and the centrifugal force. This allows material (e.g., cells) to be held or suspended in a medium, and the medium can be changed or replaced, if desired. The centrifuge 20 can create a temperature-control environment for the apparatus 10 when a lid 22 (see FIG. 7) is in a closed position. The temperature (or a temperature range) can be selectively adjusted by a user or automatically set. The apparatus 10 can be configured to be discarded after a single use.

In one embodiment, the rotor (and, therefore, the gear 24 and vessel(s) 12) can be rotated at up to several thousand (e.g., approximately 3,000) revolutions per minute (rpm), where the handle assembly 14 can be rotated at half that speed. More particularly, in one embodiment, the first bearing 26 can rotate in a first direction (e.g., counterclockwise) at approximately 1,500 rpm, and the second bearing 28 can rotate in a second direction (e.g., clockwise) at approximately 1,500 rpm. The vessel(s) 12 and the handle assembly 14 can rotate about the same axis of rotation.

One method of the present disclosure includes opening the lid 22 of the counter flow centrifuge 20 and inserting the apparatus 10 at least partially into the bowl 18 of the counter flow centrifuge 20. Next, the lid 22 can be closed to surround the apparatus 10, with at least a portion of the tubes 16 extending upwardly through an opening in the lid 22. The gear 24 of the apparatus 10 can then be driven such that the two opposing vessels 12 are rotated at twice a rotational speed of the handle assembly 10. Prior, subsequent, or simultaneously to rotation of the gear 34, fluid can be pumped from the reservoir 50 into one, two or more of the tubes 16. Stated differently, the two opposing vessels 12 can be rotated such that centrifugal forces balance draft forces, allowing a bed of particles or cells to be held in suspension. The handle assembly 14 can be rotated at half the speed of the gear 34 to maintain a closed fluid path from the external environment to each rotating vessel 12 without the need for rotating seals. Once the biopharmaceutical procedure (e.g., suspending material in the fluid in the vessels 12) is completed, the lid 22 can be opened and the apparatus 10 can be removed from the counter flow centrifuge 20. Finally, the apparatus 10 can be discarded.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An apparatus comprising:
   at least one vessel, the vessel including an inlet and an outlet;
   a gear fixedly attached to at least a portion of the vessel such that rotation of the gear rotates the vessel, the gear being configured to be rotated by a drive system;
   a handle assembly rotatably attached to the gear, the handle assembly including an opening therein, at least a portion of the gear engaging at least a portion of the drive system through the opening, the handle assembly being configured to be rotated by the drive system; and a plurality of tubes extending through the handle assembly and to the vessel, one of the plurality of tubes being connected to the inlet of the vessel and one of the plurality of tubes being connected to the outlet of the vessel, wherein the gear is rotated at twice a speed of the handle assembly when the apparatus is inserted into a bowl to suspend material in the at least one vessel.

2. The apparatus of claim 1, further comprising a first bearing located within an upper portion of the handle assembly, a second bearing located within a lower portion of the handle assembly, and a third bearing located proximate to the gear, the plurality of tubes extending through each of the bearings.

3. The apparatus of claim 1, wherein the apparatus is configured to be inserted into and removed from the bowl, and wherein the apparatus is configured to be discarded after a single use.

4. The apparatus of claim 1, wherein the plurality of tubes includes four tubes, the four tubes being configured to allow fluid containing the material to travel to and from the at least one vessel.

5. The apparatus of claim 4, wherein the at least one vessel includes a first vessel and a second vessel, the vessels being formed by two opposing plates.

6. The apparatus of claim 5, wherein each vessel has a first end and an opposing second end, the first end of each vessel being the inlet, the second end of each vessel being the outlet, a diameter of the first end being smaller than a diameter of the second end, the first end being positioned proximate an outer periphery of the plates.

7. The apparatus of claim 6, wherein the plurality of tubes include four tubes, each tube being formed of a generally flexible material and being operatively connected to at least one reservoir containing fluid.

8. The apparatus of claim 7, wherein a first one of the tubes is connected to the first end of the first vessel, a second one of the tubes being connected to the first end of the second vessel, a third one of the tubes being connected to the second end of the first vessel, and a fourth one of the tubes being connected to the second end of the second vessel.

9. The apparatus of claim 8, wherein the fluid flows into each vessel through the first end thereof and out of each vessel through the second end thereof.

10. The apparatus of claim 1, wherein a projection of the handle assembly engages at least a portion of the bowl when the apparatus is properly inserted into the bowl.

11. A method for performing counter flow centrifugation, the method comprising:

inserting an apparatus into a bowl, the apparatus including at least two spaced-apart vessels, a handle assembly, and four tubes, each tube extending from at least one reservoir, through the handle assembly and to at least one of the vessels, the reservoir containing fluid;

pumping fluid from the reservoir into two of the four tubes;

rotating the at least two opposing vessels at twice a rotational speed of the handle assembly to suspend material in the fluid in the vessels, the bowl and the handle assembly rotate at the same rotational speed;

removing the apparatus from the bowl; and discarding the apparatus.

12. The method of claim 11, wherein each vessel has a first end and an opposing second end, a diameter of the first end being smaller than a diameter of the second end.

13. The method of claim 12, wherein fluid flows into each vessel at the first end thereof, and wherein fluid flows out of each vessel at the second end thereof.

14. The method of claim 11, wherein the apparatus is formed by at least one of injection-molding, blow-molding, machining, and three-dimensional printing.

15. The method of claim 11, wherein a gear fixedly attached to at least a portion of the vessel is rotated by a drive system, and wherein the handle assembly is rotated by the drive system, the drive system forming at least a portion of a centrifuge.

16. A counter flow centrifuge comprising:

a bowl;

a drive system; and an apparatus configured for use in the bowl, the apparatus including:

at least two vessels, each vessel including an inlet and an outlet;

a gear fixedly attached to at least a portion of each vessel such that rotation of the gear rotates the vessels, the gear being configured to be rotated by the drive system;

a handle assembly rotatably attached to the gear, the handle assembly being configured to be rotated by the drive system, a projection of the handle assembly engaging at least a portion of the bowl when the apparatus is properly inserted into the bowl; and a plurality of tubes extending through the handle assembly and to the vessels, one of the plurality of tubes being connected to the inlet of each vessel and one of the plurality of tubes being connected to the outlet of each vessel, wherein the gear is rotated at twice a speed of the handle assembly when the apparatus is inserted into the bowl to suspend material in the at least one vessel when fluid containing the material flows from a reservoir, through the tubes and into the vessels.

17. The centrifuge of claim 16, wherein the bowl and the handle assembly rotate at the same rotational speed.

18. The centrifuge of claim 16, wherein the projection is spring-biased.

19. The centrifuge of claim 16, wherein the apparatus includes a first bearing located within an upper portion of the handle assembly, a second bearing located within a lower portion of the handle assembly, and a third bearing located proximate to the gear.

20. The centrifuge of claim 16, further comprising a radio-frequency identification (RFID) chip positioned on or in the apparatus.

* * * * *